(12) United States Patent
Nagai

(10) Patent No.: US 8,289,413 B2
(45) Date of Patent: Oct. 16, 2012

(54) IMAGE PROCESSING APPARATUS, IMAGE PROCESSING METHOD AND PROGRAM

(75) Inventor: Jun Nagai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 12/683,597

(22) Filed: Jan. 7, 2010

(65) Prior Publication Data

US 2010/0182453 A1    Jul. 22, 2010

(30) Foreign Application Priority Data

Jan. 16, 2009  (JP) .................................. 2009-008245

(51) Int. Cl.
*H04N 5/228* (2006.01)
(52) U.S. Cl. ................................... 348/222.1
(58) Field of Classification Search .............. 348/222.1
See application file for complete search history.

(56) References Cited

U.S. PATENT DOCUMENTS

| 7,813,635 | B2 * | 10/2010 | Tamura ...................... 396/155 |
| 2003/0076312 | A1 | 4/2003 | Yokoyama |
| 2008/0259176 | A1 | 10/2008 | Tamaru |

FOREIGN PATENT DOCUMENTS

| CN | 1414786 A | 4/2003 |
| JP | 2004-229073 | 8/2004 |
| JP | 2005-176108 | 6/2005 |
| JP | 2006-136026 | 5/2006 |
| JP | 2008-118389 | 5/2008 |
| JP | 2008-187318 | 8/2008 |

OTHER PUBLICATIONS

European Search Report dated Apr. 26, 2010, in application No. 10150790.3-2202.
Official Action dated Jun. 29, 2012, in Chinese Patent Appln. No. 201010000698.9.

* cited by examiner

*Primary Examiner* — James Hannett
(74) *Attorney, Agent, or Firm* — Fitzpatrick, Cella, Harper & Scinto

(57) ABSTRACT

An image processing apparatus has an inputting unit for inputting: image data including image data shot using a bracket shooting function; and an instruction for correction processing on the image data. The image processing apparatus also has a selecting unit for, in a case where the image data stored in the storage unit is image data that has been shot using a bracket shooting function corresponding to the correction processing instruction, selecting the image data shot using the bracket shooting function corresponding to the correction processing instruction from the image data stored in the storage unit. And, the image processing apparatus also has a processing unit for, in a case where there is no image data in the storage unit that corresponds to the correction processing instruction, performing the correction processing on the image data input by the inputting unit.

11 Claims, 12 Drawing Sheets

FIG. 12

| TYPE | SUBDIVISION |
|---|---|
| IMAGE FOR MONITOR DISPLAY | CLASS 1 |
| | CLASS 2 |
| MULTI-VIEW IMAGE | 3D VISION |
| | MULTI-ANGLE |
| CONTINUOUS SHOOTING IMAGE | |
| BRACKET IMAGE | EXPOSURE |
| | FOCUS |
| | WHITE BALANCE |
| | FLASH ILLUMINATION AMOUNT |
| | RED-EYE REDUCTION |
| | OTHER |
| PANORAMA | |

FIG. 13

| IMAGE CORRECTION PROCESSING | AUTO BRACKET SHOOTING FUNCTION |
|---|---|
| BRIGHTNESS ADJUSTMENT | EXPOSURE BRACKET SHOOTING |
| HUE ADJUSTMENT | WHITE BALANCE BRACKET SHOOTING |
| SHARPNESS ADJUSTMENT | FOCUS BRACKET SHOOTING |
| RED-EYE CORRECTION | RED-EYE REDUCTION BRACKET SHOOTING |

IMAGE PROCESSING APPARATUS, IMAGE PROCESSING METHOD AND PROGRAM

BACKGROUND OF THE INVENTION

1. Field of the Invention

The present invention relates to an image processing apparatus, an image processing method and a program, and more particularly to an image processing apparatus, an image processing method and a program for correcting image data obtained by auto bracket shooting (or autobracketing).

2. Description of the Related Art

In recent years, it has become possible to easily acquire digitized image data following the spread of digital cameras and mobile terminals with an imaging function. Opportunities for displaying and printing of this shot image data using an image processing apparatus are also increasing. A user may perform various types of correction processing with an image processing apparatus as needed, when displaying and printing this image data, such as brightness adjustment, sharpness adjustment and zoom processing, for example.

On the other hand, there are conventional cameras that are provided with an auto bracket shooting function capable of acquiring a plurality of image data at one time by taking a plurality of shots while changing a shooting condition. This auto bracket shooting includes, for example, exposure bracket shooting that involves taking a plurality of shots at one time or in quick succession at different exposure values by changing the exposure value as a shooting condition. Additionally, there is focus bracket shooting that involves also taking shots in a state of focusing in front of and behind a certain position, in addition to a state of focusing on that position. Further, there is white balance bracket shooting which is a function particular to digital cameras that involves also taking shots in a state where white balance is changed to a magenta/green bias, in addition to a reference color temperature setting. With auto bracket shooting, there is ultimately more likely to be provided image data that will be considered suitable, as a result of acquiring a plurality of image data in which a shooting condition is changed, and the user selecting a preferred image from the plurality of image data.

Associated image data is stored in association with the shooting condition, for improving operability when a series of image data shot with such auto bracket shooting is displayed or printed in an image processing apparatus. Displaying a plurality of associated image data at the same time as performing the display of the image has been disclosed (e.g., Japanese Patent Laid-open No. 2004-229073).

Also, image processing apparatuses that print a series of associated image data together along with designated image data, in order to improve operability when direct printing image data shot with auto bracket shooting, have been disclosed (e.g., Japanese Patent Laid-open No. 2005-176108).

Additionally, image correction processing on image data shot with auto bracket shooting has also been proposed. Here, a technique has been disclosed whereby the shooting conditions changed at the time of shooting are corresponded with image correction processing, and image correction processing corresponding to a shooting condition is not performed in relation to image data shot with auto bracket shooting (Japanese Patent Laid-open No. 2006-136026).

In recent years, an image data structure characterized by constituting a plurality of image data with a single file has also been proposed, and it is envisioned that this will also better facilitate the handling of a plurality of image data acquired with auto bracket shooting.

SUMMARY OF THE INVENTION

In the case where image correction processing is implemented on acquired image data in an image processing apparatus, it is in fact possible that the processing result will not be as the user intended. For example, if the original image data is markedly bright or dark in the case of having performed brightness adjustment, obtaining optimal image data will be difficult with only correction by image processing. Envisioning such problems with auto bracket shooting, a plurality of image data are acquired by performing exposure bracket shooting in relation to image brightness, for example. It becomes possible to ultimately provide image data of a brightness that best fits the intent of the user, as a result of the user then selecting from the plurality of acquired data.

However, with the techniques disclosed heretofore, the operations involved are not always easy, in the case where the acquisition of appropriate image data from a plurality of image data obtained by auto bracket shooting is envisioned.

With Japanese Patent Laid-open No. 2004-229073, a plurality of image data having different shooting conditions are displayed as a list, and the user needs to select the most appropriate image data. However, comparing and selecting image data is not easy due to restrictions such as display size in an image processing apparatus, in the case where the idea is, for example, to connect a digital camera directly to an image forming apparatus such as a printer, and directly transfer and print data.

Also, with Japanese Patent Laid-open No. 2005-176108, a list of image data shot with auto bracket shooting is printed in the case of direct printing, but this is time consuming since the user ultimately has to choose optimal image data from that printed list.

Similarly with Japanese Patent Laid-open No. 2006-136026, the user needs to compare the plurality of image data shot with auto bracket shooting, and select image data having an optimal brightness, in order to acquire image data best fitting the user's intent. Further, image correction processing needs to be performed on the selected image data according to the degree of image quality, and configuring the settings for this processing is complicated.

The present invention has been made in consideration of the above problems. It is desirable to provide appropriate image data to be more easily provided with an identical operation, without the user being made aware of whether or not the image data was shot with auto bracket shooting.

According to one aspect of the present invention, there is provided an image processing apparatus comprising: an inputting unit for inputting: image data including image data shot using a bracket shooting function; and an instruction for correction processing on the image data; a storage unit for storing the input image data; a selecting unit for, in a case where the image data stored in the storage unit is image data that has been shot using a bracket shooting function corresponding to the correction processing instruction, selecting the image data shot using the bracket shooting function corresponding to the correction processing instruction from the image data stored in the storage unit; and a processing unit for, in a case where there is no image data in the storage unit that corresponds to the correction processing instruction, performing the correction processing on the image data input by the inputting unit.

According to another aspect of the present invention, there is provided an image processing method comprising: inputting: image data including image data shot using a bracket shooting function; and an instruction for correction processing of the image data; storing the image data; a selecting step of, in a case where image data shot using a bracket shooting function corresponding to the correction processing is stored, selecting the image data shot using the bracket shooting function corresponding to the correction processing from the image data in the storage, a processing step of, in a case where image data shot using a bracket shooting function corresponding to the correction processing is not stored, performing the correction processing on the input image data.

It is desirable to obtain a higher quality image than an image corrected by correction processing when displaying or printing image data, without the user being made aware of whether or not targeted image data is included in an image file composed of a plurality of image data.

Further features of the present invention will become apparent from the following description of exemplary embodiments (with reference to the attached drawings).

BRIEF DESCRIPTION OF THE DRAWINGS

FIG. 12 shows example type information of individual images in embodiments of the present invention.

FIG. 13 shows example auto bracket shooting functions corresponding to correction processing in embodiments of the present invention.

DESCRIPTION OF THE EMBODIMENTS

Hereinafter, a best mode for implementing the present invention will be described using the drawings. Note that while the case where printing is performed with a color printer will be described hereinafter as a best mode for implementing the present invention, the present invention is not limited to this, and can be applied, in a scope that does not deviate from the gist thereof, to an image processing apparatus that performs display on a display, printing to an arbitrary multifunctional device, or the like.

First Embodiment

An embodiment of the present invention will be described in accordance with the drawings.

Figure 11:
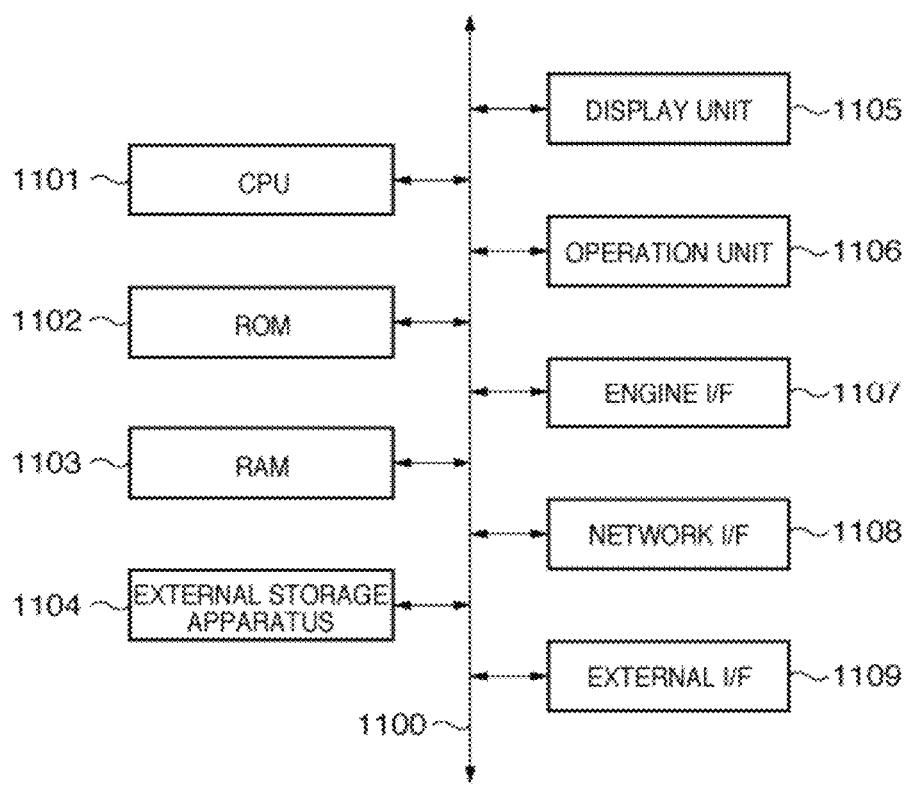
FIG. 11 is a block diagram showing a basic configuration of a system according to embodiments of the present invention.

FIG. 11 is a block diagram showing a basic configuration of an image forming apparatus such as an MFP (multi-function peripheral) or a printer according to embodiments of the present invention. This system is provided with a CPU 1101, a ROM 1102, a RAM 1103, an external storage apparatus 1104, a display unit 1105, an operation unit 1106, an engine I/F (interface) 1107, a network I/F unit 1108, an external I/F 1109, and a system bus 1100.

Describing the above configuration in detail, the CPU 1101, which is a central processing unit that performs overall control of the apparatus, arithmetic processing, and the like, executes various processing (described below) based on programs stored in the ROM 1102. The ROM 1102, which is a read-only memory, is a storage area for system startup programs and programs for performing printer engine control. The RAM 1103, which is a random access memory, has programs and data loaded therein and executed each time various processing is performed. The RAM 1103 can also be used as a data storage area for received image data. The external storage apparatus 1104, which is constituted by a hard disk, for example, spools data, stores programs, image data, shooting conditions and the like, and is used as a work area. The display unit 1105, which is for performing liquid crystal display or the like, for example, is used for display of the setting state of the apparatus, processing currently being performed in the apparatus, error states and the like. The operation unit 1106, which is used for changing and resetting settings, is also capable of displaying operation windows for performing image correction such as will be described below, together with the display unit 1105. The engine I/F 1107 is the portion that actually handles printer engine control, toner supply commands, and the like. The network I/F 1108 is for connecting the apparatus to a network via the network I/F 1108. The external I/F 1109 is connected to an external apparatus via a parallel (or serial) interface or the like. The system bus 1100 is intended to form a data path between the abovementioned constituent elements.

Figure 1:
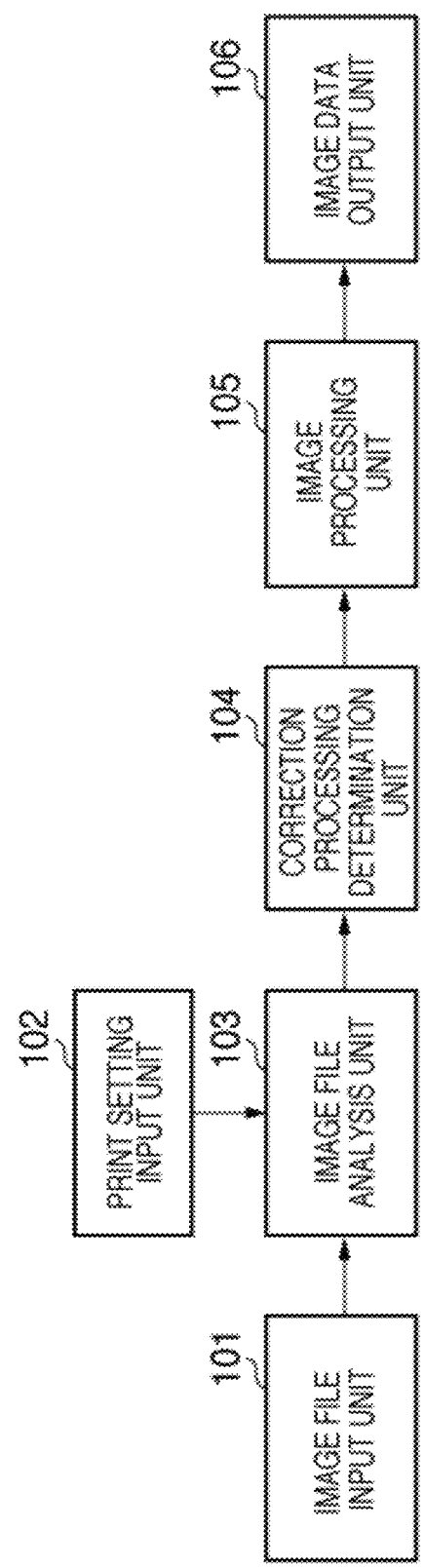
FIG. 1 is a block diagram showing a schematic configuration of an image processing apparatus in embodiment 1 of the present invention.

FIG. 1 is a block diagram showing a schematic configuration of the region that performs the various processing of the image processing apparatus in embodiment 1 of the present invention. An image file input unit 101 inputs image files composed of image data shot using an imaging apparatus (not shown) and shooting information that includes the shooting conditions (e.g., exposure value, white balance correction amount, etc.) of when the image data was shot.

Note that in the present embodiment, an imaging apparatus that records input image files has at least an auto bracket shooting function, together with a normal shooting function. Here, an auto bracket shooting function is a function capable of imaging a plurality of image data under changed shooting conditions using a single shooting operation. In particular, auto bracket shooting for changing the exposure value as a shooting condition is called exposure bracket shooting, and specifically involves shooting three images at the same time, or in quick succession, using a single shooting operation, while changing the exposure value through the three steps of standard, plus 1 step correction and minus 1 step correction. The number of the abovementioned exposure value steps and the amount of change per exposure value step can be changed by the imaging apparatus.

Note that the method of inputting image files includes, for example, the case where an image file is sent to a host PC via the network I/F 1108, and the case where an image file is input via the external I/F 1109 after directly connecting the imaging apparatus and the image processing apparatus. Depending on the image processing apparatus, it is also possible to designate and output an image file pre-stored in the external storage apparatus 1104, with there being no particular restrictions in relation to the method of inputting image files. Note that an input image file here includes one image data (i.e. data for a single image) or a series of image data (i.e. data for a series of images).

The print setting input unit 102 has various types of setting information relating to brightness adjustment, sharpness adjustment, zooming, and the like input thereto. Input of various settings includes the case where settings are input with the operation unit 1106 via the display unit 1105 of the image processing apparatus, and the case where settings are input as control commands together with the image file from the host PC. An image file analysis unit 103 analyzes image data on the basis of print settings input by the print setting input unit 102. A correction processing determination unit 104 determines the correction method corresponding to the setting items input by the print setting input unit 102, based on the analysis result of the image file analysis unit 103. Input print settings, the detailed image file analysis at this time and the determination method will be discussed below. An image processing unit 105 performs image correction processing that involves brightness adjustment and sharpness adjustment as needed, on the basis of the determination result of the correction processing determination unit 104, with respect to image data in an input image file.

Also, input image data undergoes image processing such as color conversion processing and pseudo-halftone processing, and is converted to an outputable image format in an image data output unit 106. Here, assume that the image data input to the image data output unit 106 is image data corresponding to developer of the four colors CMYK, and that the image data acquired in the image file input unit 101 is YCbCr color space image data or RGB color space image data. In this case, conversion processing is performed in the image processing unit 105 that involves converting the image data to CMYK color space image data using a lookup table (LUT), a matrix operation, or the like. Also, normally, the image data output unit 106 is often only able to output low gray levels such as 2, 4 or 16 gray levels. Accordingly, pseudo-halftone processing is performed in the image processing unit 105 such as to also enable stable halftone representation in the image data output unit 106 which is only able to output a few gray levels. Print processing is implemented as a result of output image data being transferred to the image data output unit 106 as a video signal via the engine I/F 1107.

Figure 2:
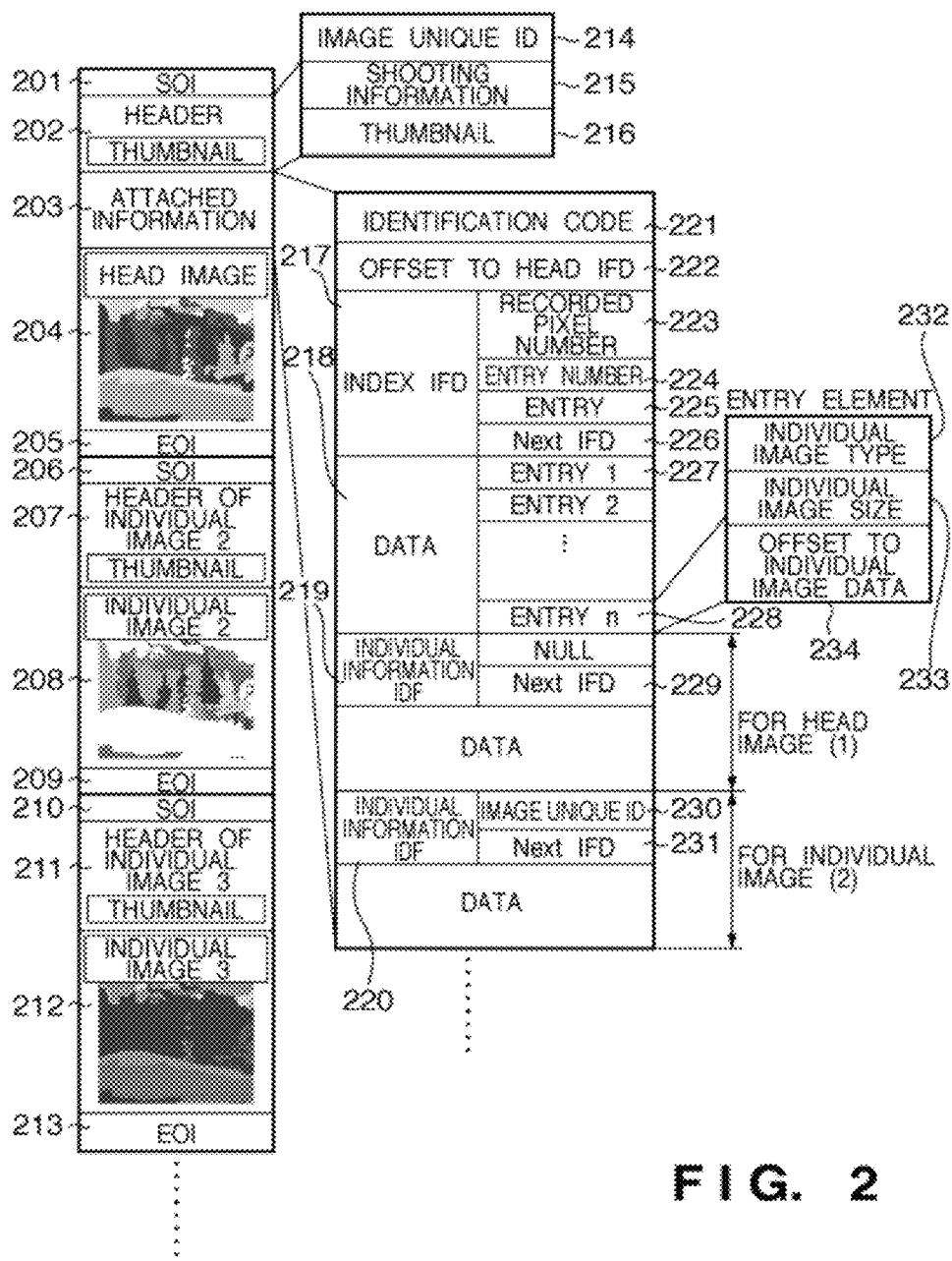
FIG. 2 shows an example format of an input image file in embodiment 1.

An example format of an input image file in the present embodiment is shown in FIG. 2. The image file in FIG. 2 includes a plurality of image data and shooting information, and is constituted by a single file in which the image data and the shooting information are associated.

Individual images constituting an image file are image data that exist in an area sandwiched between a pair of markers consisting of an SOI marker (201, 206, 210) indicating the start of the image (SOI) and an EOI marker (205, 209, 213) indicating the end point of the image (EOI). Of the individual images constituting the image data, the individual image recorded at the head of the file will in particular be here called a head image 204, and the area in which the head image is recorded will be called the head image area. In the case of performing display or printing, normally the head image is targeted.

The format of the image file is such that the head image area is recorded at the head of the data as shown in FIG. 2, after which one or a plurality of individual images are recorded. Here, tags defined by Exif (Exchangeable Image File format) are respectively recorded in the headers (202, 207, 211) of the individual images. Exif defines the format of files to which shooting information at the time of shooting has been added along with the shot image data. Also, Exif is employed in the digital cameras of various manufacturers along with the file system standard DCF (Design rule of Camera File system). Note that an image unique ID 214 for specifying an image, shooting information 215 containing the shooting condition of respective image data, and a thumbnail 216 are respectively recorded in the header 202.

Attached information 203 relating to the image file is recorded in the head image area, separately to the header corresponding to the head image. Firstly, an identification code 221 indicating whether the input image file is an image file constituted by a plurality of image data, and an offset 222 to a head IFD (Image File Directory) are recorded in the attached information. Here, the link structure of the IFD is such that one index IFD 217, followed by one or more individual information IFDs (219, 220) follow on from the offset 222 to the head IFD. Next IFDs (226, 229, 231) in the link source IFDs are used to point between the IFDs. The individual information IFD 220 contains an image unique ID 230 for specifying an image.

Note that with the image data format, an index IFD 217 is defined as a collection of tags indicating the overall configuration of the individual images. The index IFD 217 is constituted by a recorded pixel number 223 of the image file, an entry number 224, which is the number of recorded images, and an entry 225. Also, each entry is itself a single data structure (this structure is called an entry element) storing an individual image type 232, an image size 233, and an offset 234 to the image data, and entries (227, 228) equal to the number represented by the entry number are recorded in a data portion 218.

Information for managing the types of individual images is stored in the individual image type 232 included in the entry elements. FIG. 12 shows an example of managed type information of individual images.

In the present embodiment, type information indicating the types of targeted individual images as being monitor display image, multi-view image, continuous shooting image, bracket image and panorama image, and subdivisions of further detailed functions within the types is stored. For example, in the case where the image type is bracket image, the subdivision indicates the types of bracket shooting functions. Specifically, these include exposure, focus, white balance, flash illumination amount, red-eye reduction and the like at the time of shooting. The image file analysis unit 103 performs input image file analysis, with respect to an input image file having the aforementioned format. The image file analysis unit 103 discriminates as to whether the input image was shot using an auto bracket shooting function, by focusing particularly on the individual image type 232 included in the entry elements. Further, the image file analysis unit 103, in the case where it is determined that the image data was shot with auto bracket shooting, also determines which of the auto bracket shooting functions the image data was shot with. As described above, the determination is performed for implementing correction processing, with the attached information included in the image file as a prescribed condition.

Note that, in the present embodiment, an example is given where an input image file consists of a plurality of image data managed as a single image file in association with shooting conditions, but it is also conceivable that respective image data are recorded as separate files. In this case, the present invention is also applicable with respect to a method of managing the association between the plurality of image data and shooting conditions separately, such as, for example, a method of creating a separate management file in which the filenames of image data associated with respective image data are written together.

Processing Flow in Embodiment 1

Figure 3:
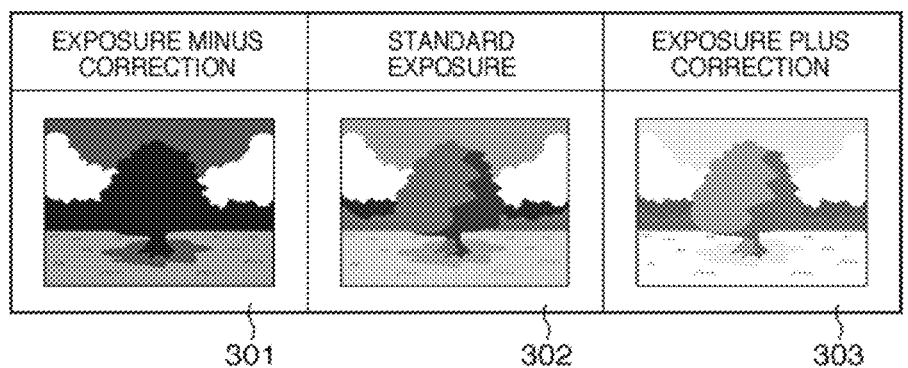
FIG. 3 shows an example of a plurality of image data shot using exposure bracket shooting.

An example will now be described in which printing is performed after performing brightness adjustment as image correction processing, with an image file composed of a plurality of image data shot using exposure bracket shooting as the input image file. Firstly, an example of a plurality of image data shot using exposure bracket shooting is shown in FIG. 3. Reference numeral 302 in FIG. 3 is image data shot with standard exposure, and reference numerals 301 and 303 in FIG. 3 are respectively image data shot with exposure minus correction and exposure plus correction. An image file is input in which these image data are managed in one file, with the image data shot with standard exposure at the head image, and the minus corrected and plus corrected image data as individual images. Also, information indicating that the image data has been shot with exposure bracket shooting, out of the types of the individual images illustrated in FIG. 12, is held.

Next, information relating to brightness adjustment, out of the various image correction processing, is input by the user to the print setting input unit 102.

Figure 4:
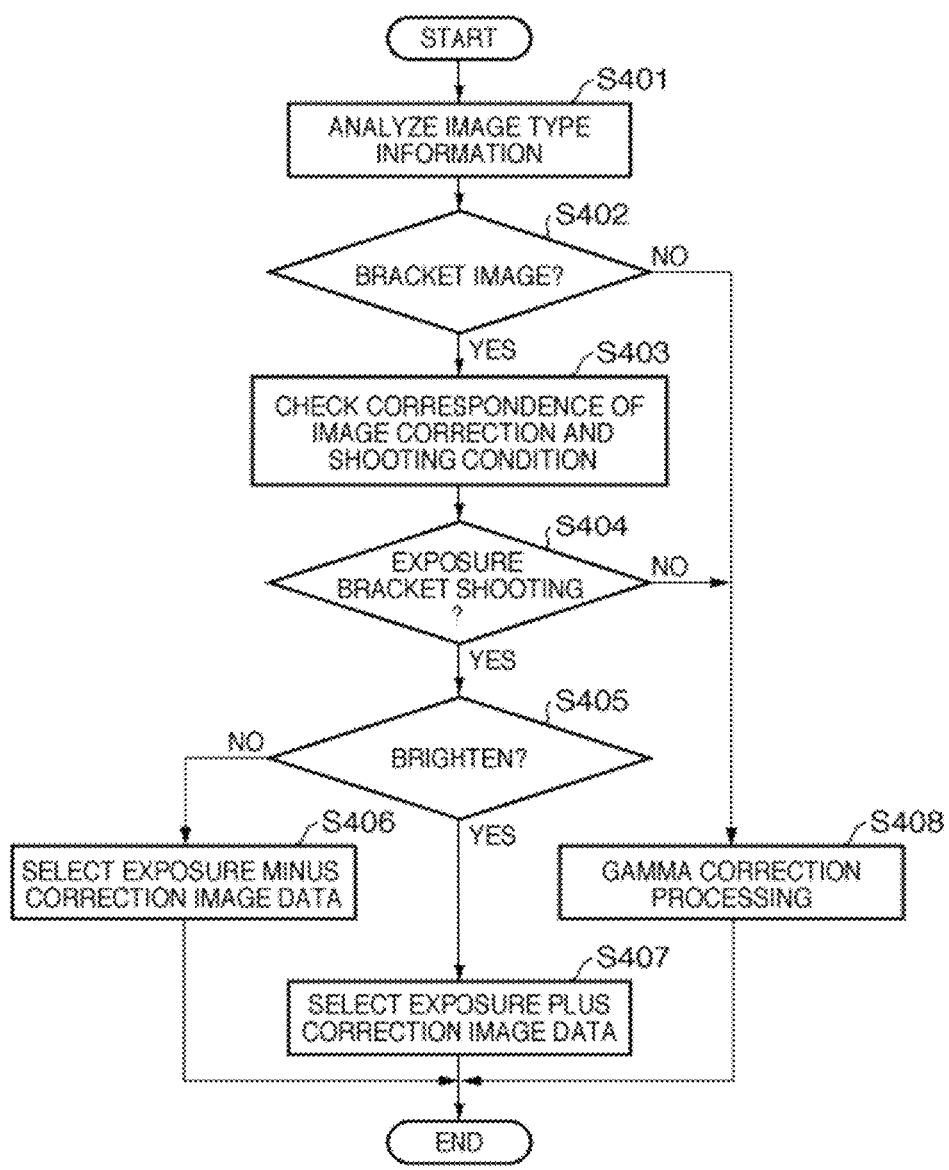
FIG. 4 is a flow diagram of brightness adjustment processing in embodiment 1 of the present invention.

FIG. 4 is a flow diagram of brightness adjustment processing in embodiment 1 of the present invention. The following adjustment processing is executed by the CPU 1101, based on a program stored in the ROM 1102. In the case where an instruction to execute brightness adjustment is accepted by the print setting input unit 102, firstly, input image file analysis processing is performed in the image file analysis unit 103 (S401). Specifically, the image file analysis unit 103 analyzes the type information of the image, identifies whether the input image data is an image shot using auto bracket shooting, and stores information indicating the identification result. Further, in the case where the input image data is identified as being an image file composed of a plurality of image data shot using auto bracket shooting, the image file analysis unit 103 identifies which of the auto bracket shooting functions the input image data was shot with out of the subdivisions given in FIG. 12, and stores information indicating the identification result. Note that while a plurality of bracket images are included in a single file, the subdivision information of any of the data may be used, because the subdivisions should be same if the images where all shot using an auto bracket shooting function. Here, if the input image file is determined to not be constituted by image data shot using auto bracket shooting (S402: NO), correction processing by image processing is performed as the brightness adjustment processing. Brightness correction processing by image processing in the present embodiment is gamma (γ) correction processing (S408).

On the other hand, in the case where the input image file is analyzed as being constituted by a plurality of image data shot using auto bracket shooting (S402: YES), the processing proceeds to S403. At S403, identification of the correspondence between the type of correction processing designated by the print setting input unit 102 and the type of auto bracket shooting function used in that correction processing is performed.

When the image data shot by using the bracket shooting function corresponding to the above-mentioned correction processing is in RAM 1103 or storage such as external storage unit 1104, the image data shot by using the bracket shooting function corresponding to the above-mentioned correction processing is selected. On the other hand, when the image data shot by using the bracket shooting function corresponding to the above-mentioned correction processing is not in the RAM 1103 or in a storage such as external storage unit 1104, the above-mentioned correction processing is executed to the input image data. In other words, auto bracket shooting means that a series of slightly different images is stored (e.g. in a storage unit). The slight difference may be in brightness, for instance. If a correction is requested of an image, if that correction is the same alteration to the image as the auto bracket shooting was applying (e.g. brightness), instead of correcting the image, an existing image may simply be selected from the storage unit that already satisfies that correction condition.

FIG. 13 shows a correspondence table of correction processing and auto bracket shooting functions. As shown in FIG. 13, the auto bracket shooting functions are corresponded with respective correction processing, in the embodiments of the present invention. Brightness adjustment is corresponded with exposure bracket shooting of the auto bracket shooting, as shown in FIG. 13. Here, the handling of correspondence between the correction processing and shooting functions shown in FIG. 13 will be touched on. In the table in FIG. 13, the correspondence may be fixed, or may be held as changeable or extendible data. In the present embodiment, the correspondence relation is fixed, and as part of the processing procedures it is determined whether that correspondence relation is satisfied. That is, at S403, it is determined whether the subdivision of the bracket shooting function determined at S401 is exposure bracket shooting. Subsequently, the processing branches at S404, according to the determination result. Note that in the case where the correspondence table in FIG. 13 is held as data, the correction (here, brightness adjustment) designated based on the correspondence table is retrieved at S403, and the bracket shooting function corresponding thereto is read. After the correspondence has been read, it is determined whether the auto bracket shooting function of the input image data corresponds to the correction processing. That is, it is determined whether the subdivision read at S401 coincides with the bracket shooting function read at S403. In the present embodiment, it is determined whether the input image data is an exposure bracket image (S404). If it is determined that the input image data is not an exposure bracket image, despite being a plurality of image data shot using auto bracket shooting (S404: NO), correction processing is performed by image processing (S408).

On the other hand, if the input image file is constituted by image data shot using exposure bracket shooting, which corresponds to brightness adjustment (S404: YES), the processing proceeds to S405. At S405, another individual image that differs from the standard exposure head image is selected, as the processing result of brightness adjustment, assuming that this image satisfies the defined correspondence relation. Specifically, image data shot using plus correction in the case of "adjust to brighten" (S405: YES) being set (S407), and minus correction image data is selected in the case of "adjust to darken" (S405: NO) being set (S406).

Figure 5:
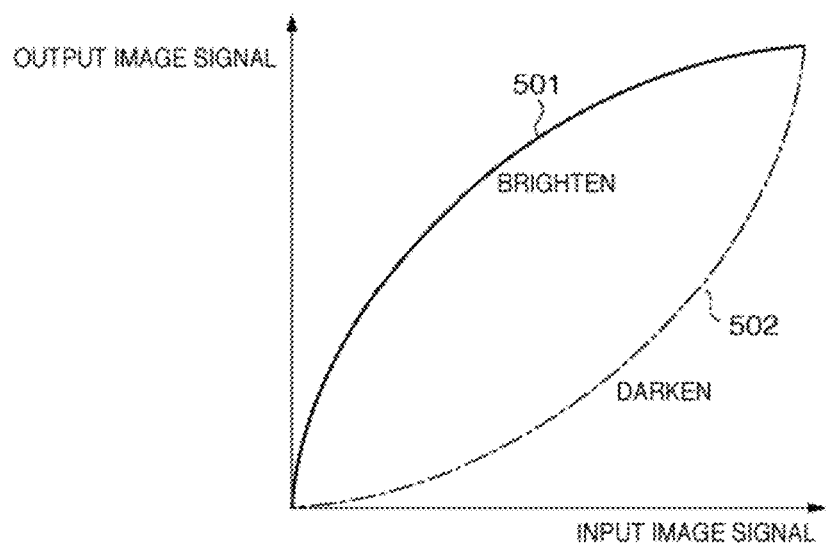
FIG. 5 shows conversion of a signal value for image correction by gamma (γ) correction processing.

Conversion of a signal value for image correction by gamma (γ) correction processing is shown in FIG. 5. The signal conversion shown in FIG. 5 is performed using gamma (γ) correction processing performed on an input signal, and the brightness of the image is adjusted. Note that signal conversion when "adjust to brighten" is set in the brightness adjustment is shown by the solid line 501 in FIG. 5, and signal conversion when "adjust to darken" is set is shown by the dashed line 502.

Note that the adjustment steps of brightness adjustment in the present embodiment are one step above and below for "brighten" or "darken", but in the case where exposure correction by an imaging apparatus is compatible with two steps above and below, the compatible steps may also be increased in response, with respect to the steps of brightness adjustment.

Also, in the present embodiment, the correspondence between brightness adjustment and exposure bracket shooting was given as an example, but implementation is not limited to this, and can, of course, be applied in relation to a combination of other correction processing and auto bracket shooting functions, as evident in the correspondence table of FIG. 13. Additionally, as mentioned above, the correspondence table may be changed or extended according to the functions.

According to embodiment 1 of the present invention as described above, when performing correction processing on image data, the user is able perform correction processing with a similar operation procedure in either case, without being aware of whether or not the input image data is a plurality of image data shot using auto bracket shooting.

Also, in brightness processing, for example, image quality is sometimes impaired in brightness adjustment by image processing, in the case where the input image data is markedly dark. However, with the present embodiment, a high quality image can be easily obtained by selecting a plus image from exposure bracket images according to the conditions.

Second Embodiment

In embodiment 1, in the case where the input image file was a plurality of image data resulting from auto bracket shooting, one image data corresponding to the correction processing was selected from the plurality of image data, and output as the correction processing result. Accordingly, in the case where shooting is only performed to one step above and below with exposure bracket shooting or the like, the adjustment steps of the correction processing will also correspondingly be to one step above and below. In embodiment 2, when performing correction processing, finer correction is realized, by using a plurality of the image data in an image file.

An example will now be described in which printing is performed after performing brightness adjustment as image correction processing, with an image file composed of a plurality of image data shot using exposure bracket shooting as the input image file. Note that in embodiment 2, similarly to embodiment 1, it is identified whether image data included in an input image file was shot using auto bracket shooting. Then, when performing image correction on image data shot with auto bracket shooting, the shooting condition and the image correction processing are compared. Then, if there is correspondence between the shooting condition and the image correction processing, based on a predefined correspondence table, the image correction processing is implemented on the basis of other image data shot with auto bracket shooting.

Figure 6:
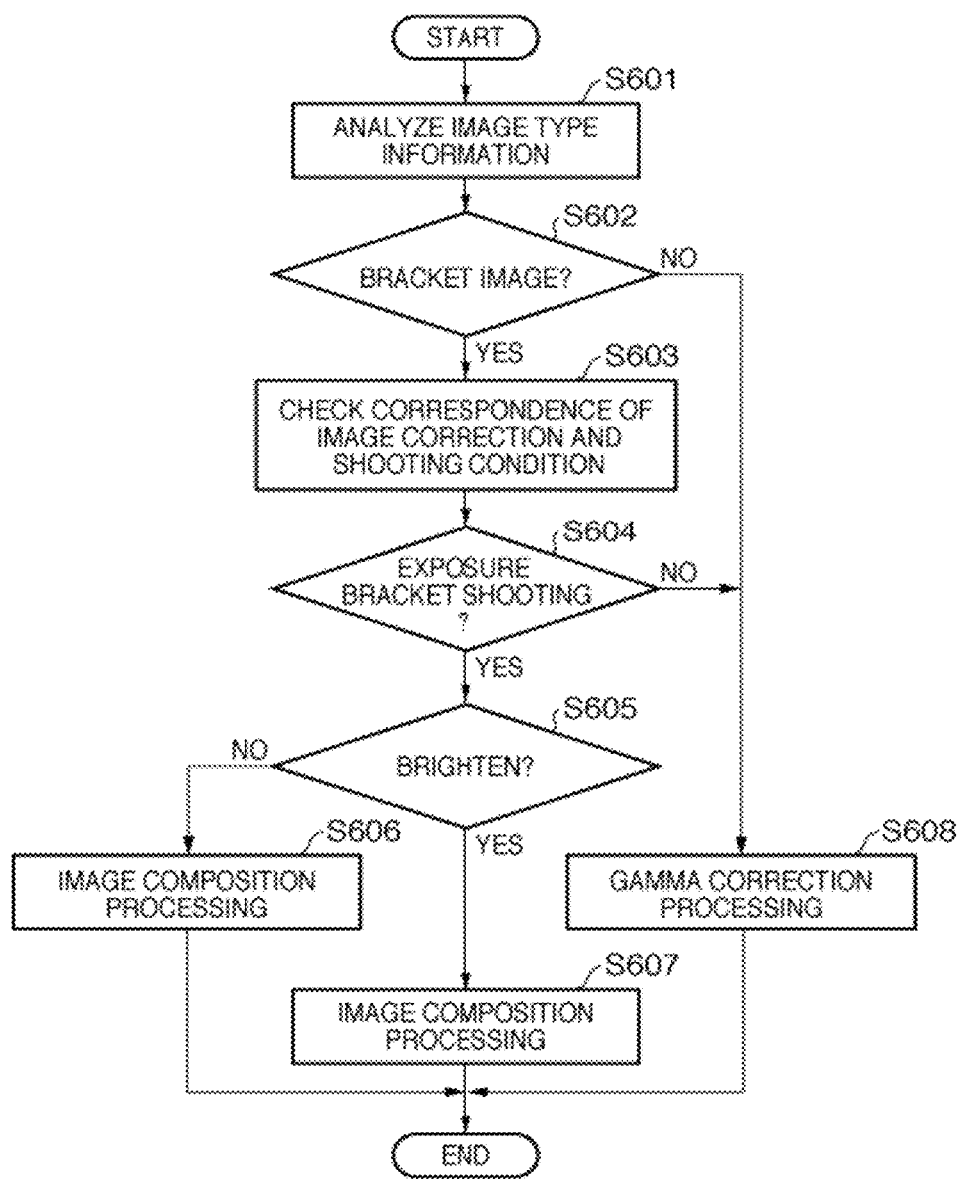
FIG. 6 is a flow diagram of brightness adjustment processing in embodiment 2 of the present invention.

FIG. 6 is a flow diagram of brightness adjustment processing in embodiment 2 of the present invention. The following adjustment processing is implemented by the CPU 1101 based on a program stored in the ROM 1102. Note that the schematic configuration of the image processing apparatus in embodiment 2 is similar to embodiment 1. In the case where an instruction to execute brightness adjustment is accepted by the print setting input unit 102, firstly, input image file analysis processing is performed in the image file analysis unit 103 (S601). Specifically, the image file analysis unit 103 analyzes the type information of the image, and identifies whether the input image data is an image shot using auto bracket shooting. Further, in the case where the input image data is determined to be an image file composed of a plurality of image data shot using auto bracket shooting, the image file analysis unit 103 identifies which of the auto bracket shooting functions the input image data was shot with, out of the subdivision of functions shown in FIG. 12.

Here, if the input image file is identified as not being constituted by image data shot using auto bracket shooting (S602: NO), correction processing by image processing is performed as the brightness adjustment processing. Brightness correction processing by image processing in the present embodiment is gamma (γ) correction processing (S608).

On the other hand, if the input image file is identified as being constituted by a plurality of image data shot using auto bracket shooting (S602: YES), the correspondence between the designated type of correction processing and the type of auto bracket shooting function is identified (S603). Identification of the correspondence here is similar to embodiment 1 of the present invention. After the correspondence has been identified, it is determined whether the auto bracket shooting function of the input image data corresponds to the correction processing. In the present embodiment, it is determined whether the input image data is an exposure bracket image (S604). If it is determined that the input image data is not an exposure bracket image, despite being a plurality of image data shot using auto bracket shooting (S604: NO), correction processing is performed by image processing (S608).

On the other hand, if the input image file is constituted by image data shot using exposure bracket shooting, which corresponds to brightness adjustment (S604: YES), the result of image composition processing with other individual image that differs from the head image shot with standard exposure is output as the processing result of the adjustment processing. Specifically, in the case where "adjust to brighten" is set (S605: YES), image composition processing of image data shot using plus correction and standard exposure image data is performed (S607), and in the case where "adjust to darken" is set (S605: NO), image composition processing of image data shot using minus correction and standard exposure image data is performed (S606).

Figure 7:
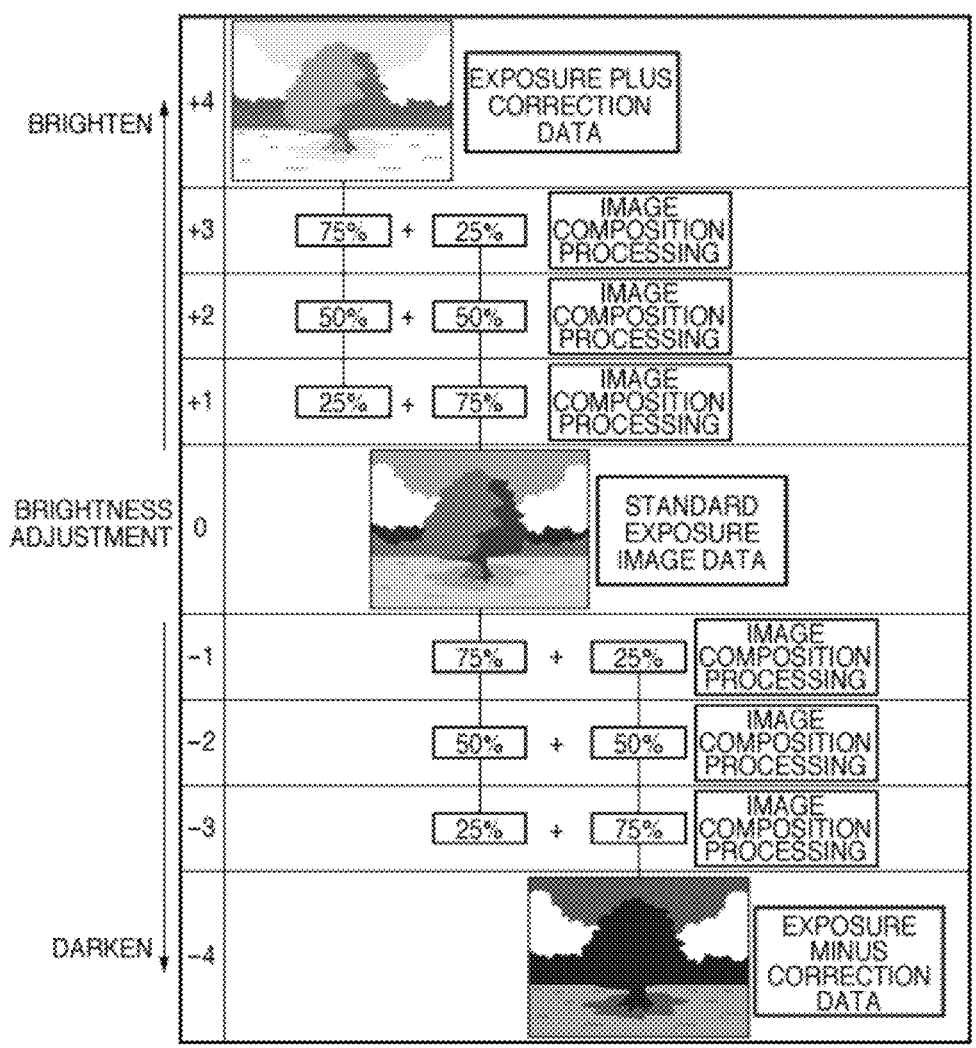
FIG. 7 shows a concept of processing in embodiment 2 of the present invention.

Image composition processing in the present embodiment will now be described. FIG. 7 shows the concept of the present embodiment. In embodiment 2, it is possible to realize nine step brightness adjustment from +4, at which the brightness adjustment step is corrected to be the brightest, to −4, at which the brightness adjustment step is corrected to be the darkest.

Here, in the case where "adjust to brighten" is set in the brightness adjustment, composition processing of standard exposure image data and image data shot using exposure plus correction is performed (S607). Image composition processing will now be described in detail using computation equations and pixel values. In the case of composing two image data, the composed value is given as Ic, where I0(x,y) and I1(x,y) are pixel values of the position (x,y) of the respective image data. Also, the pixel value of the position (x,y) of image data generated by the image composition processing is as follows, when the composition ratio is given as t:1−t (0≦t≦1)

$$Ic(x,y) = t \times I0(x,y) + (1-t) \times I1(x,y)(t:1-t(0 \leq t \leq 1))$$

In the present embodiment shown in FIG. 7, the adjustment steps and composition ratios of the brightness adjustment are as follows, in the case where a pixel value of the standard exposure image data is given as I0(x,y) and a pixel value of the exposure correction image data is given as I1(x,y).

Brighten +1: t=0.75
Brighten +2: t=0.50
Brighten +3: t=0.25
Brighten +4: t=0.00

Similarly, in the case where "adjust to darken" is set in the brightness adjustment, composition processing of standard exposure image data and image data shot using exposure minus correction is performed. The adjustment steps and composition ratios of the brightness adjustment at this time are as follows.

Darken −1: t=0.75
Darken −2: t=0.50
Darken −3: t=0.25
Darken −4: t=0.00

The image composition result is output as the correction processing result, using these correction values. Note that in the case of focusing only on the processing of "brighten +4"

and "darken −4", the output result of embodiment 2 will be equivalent to the output result of embodiment 1.

Note that in the present embodiment, in the case where the input image data is determined to be image data shot using auto bracket shooting, correction by image composition processing is performed, but it may be suggested to the user that the input image data is a bracket image when performing the determination of FIG. 6, step S602. In that case, it is also conceivable to have a function of presenting selection of whether to perform correction by image processing or correction by image composition processing.

According to embodiment 2 of the present invention as described above, when performing correction processing on image data, the user is able perform correction processing with a similar operation procedure in either case, without being aware of whether or not the input image data is a plurality of image data shot using auto bracket shooting. Further, a high quality image can be easily obtained by performing appropriate image composition processing on a plurality of image data to perform finer adjustment.

Third Embodiment

In embodiment 2, when performing correction processing, finer correction is realized by selecting a plurality of the image data in the image file, and performing composition processing thereof. However, in the case where brightness adjustment is considered, for example, the exposure of image data shot with an auto bracket function cannot be corrected to a brighter image than the plus correction image data. In embodiment 3 of the present invention, finer correction is realized by combining image composition processing of image data in an image file and correction processing by image processing, when performing correction processing.

An example will now be described in which printing is performed after performing brightness adjustment as image correction processing, with an image file composed of a plurality of image data shot using exposure bracket shooting as the input image file. Note that in embodiment 3, similarly to embodiment 1, it is judged whether image data included in an input image file was shot using auto bracket shooting. Then, when performing image correction on image data shot with auto bracket shooting, the shooting condition and the image correction processing are compared. Next, if there is correspondence between the shooting condition and the image correction processing, based on a predefined correspondence table, the image correction processing is implemented on the basis of other image data shot with auto bracket shooting.

Figure 8:
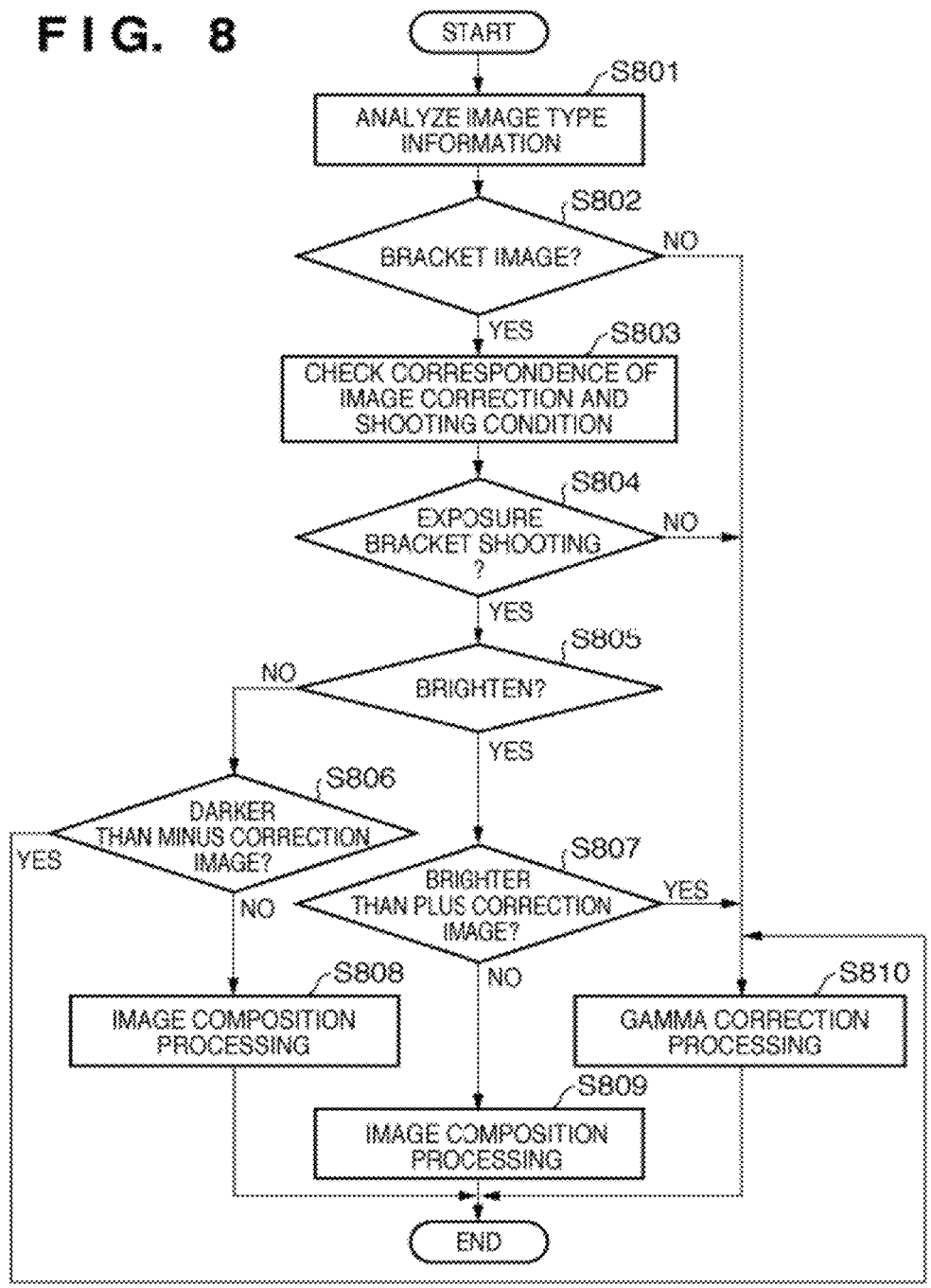
FIG. 8 is a flow diagram of brightness adjustment processing in embodiment 3 of the present invention.

FIG. 8 is a flow diagram of brightness adjustment processing in embodiment 3 of the present invention. The following adjustment processing is implemented by the CPU 1101 based on a program stored in the ROM 1102. Note that the schematic configuration of the image processing apparatus in embodiment 3 is similar to embodiment 1. In the case where an instruction to execute brightness adjustment is accepted by the print setting input unit 102, firstly, input image file analysis processing is performed in the image file analysis unit 103 (S801). Specifically, the image file analysis unit 103 analyzes the type information of the image, and identifies whether the input image data is an image shot using auto bracket shooting (S802). Further, in the case where the input image file is identified as being an image file composed of a plurality of image data shot using auto bracket shooting, the image file analysis unit 103 identifies with which of the auto bracket shooting functions the input image data was shot (S803). Here, in the case where the input image file is analyzed as not being constituted by image data shot using auto bracket shooting (S802: NO), correction processing by image processing is performed as the brightness adjustment processing. Brightness correction processing by image processing in the present embodiment is gamma (γ) correction processing (S810).

On the other hand, if the input image file is analyzed as being constituted by a series of image data shot using auto bracket shooting (S802: YES), the correspondence between the designated type of correction processing and the type of auto bracket shooting function is identified (S803). Identification of the correspondence here is similar to embodiment 1 of the present invention. After the correspondence has been identified, it is determined whether the auto bracket shooting function of the input image data corresponds to the correction processing. In the present example, it is determined whether the input image data is an exposure bracket image (S804). If it is determined that the input image data is not an exposure bracket image, despite being a plurality of image data shot using auto bracket shooting (S804: NO), correction processing is performed by image processing (S810).

On the other hand, if the input image file is constituted by image data shot using exposure bracket shooting, which corresponds to brightness adjustment (S804: YES), the setting of the step of the brightness adjustment is determined (S805). If the image data is to be brightened (S805: YES) and the brightness adjustment is not bright in comparison with the image data shot using plus correction (S807: NO), image composition processing of the image data shot using plus correction and the standard exposure image data is performed, similarly to embodiment 2 (S809). On the other hand, if the step of the brightness adjustment is bright relative to the image data shot using plus correction (S807: YES), brightness correction processing by image processing is implemented on the image data shot using plus correction (S810).

Similarly, in the case of adjusting to darken (S805: NO), if the step of the brightness adjustment is not dark in comparison with the image data shot using minus correction (S806: NO), image composition processing of the image data shot using minus correction and the standard exposure image data is performed, similarly to embodiment 2 (S808). On the other hand, if the step of the brightness adjustment is dark relative to the image data shot using minus correction (S806: YES), brightness correction processing by image processing is implemented on the image data shot using minus correction (S810).

Hereinafter, comparison of the steps of the brightness adjustment and the brightness of image data will be discussed. Shooting information 215 defined by Exif is held for respective image data, using the image file format shown in FIG. 2. The exposure value serving as a shooting condition is also recorded therein. Here, consider the case where one adjustment step in the brightness adjustment corresponds to an exposure value of 0.5 EV as an example. In this case, if image data is shot while changing the exposure value by ±1.0 EV in exposure bracket shooting, image data shot using plus correction will correspond to brighten +2 of the brightness adjustment. The steps of the brightness adjustment and the brightness of image data are thus compared. Similarly, with image data shot using minus correction, the brightness adjustment corresponds to darken −2.

Figure 9:
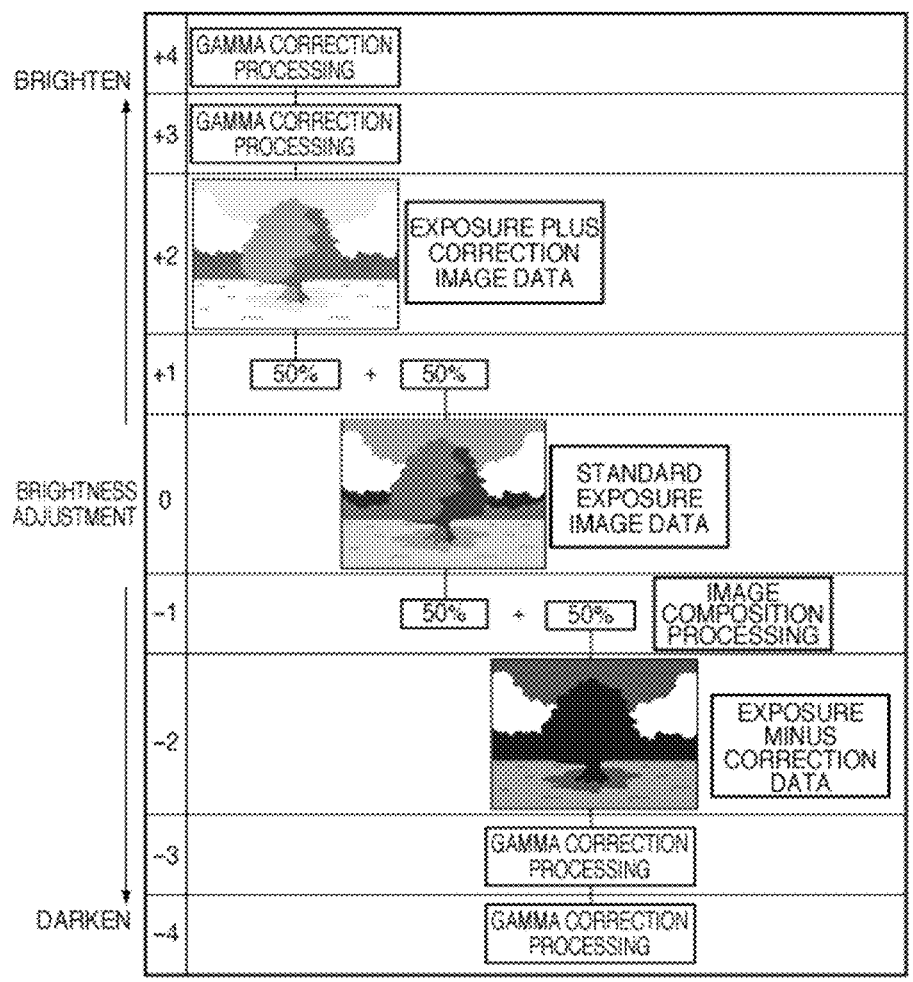
FIG. 9 shows a concept of processing in embodiment 3 of the present invention.

FIG. 9 shows the concept of the present embodiment. In embodiment 3, it is possible to realize nine step brightness adjustment from +4, at which the brightness adjustment step is corrected to be the brightest, to −4, at which the brightness adjustment step is corrected to be the darkest. Here, in the case where "adjust to brighten" is set in the brightness adjustment, firstly comparison of the step of the brightness adjustment and the brightness of the image data is performed. In the case where one adjustment step in the brightness adjustment corresponds to an exposure value of 0.5 EV, and the amount of change per exposure value step in exposure bracket shooting is 1.0 EV, the brightness of the image data shot using plus correction will correspond to adjust to brighten +2. Accordingly, the following results in the case where brightness adjustment has been changed in the direction of adjust to brighten.

Brighten +1: image composition of standard exposure image data 0.5 and exposure plus correction image data 0.5
Brighten +2: exposure plus correction image data
Brighten +3: gamma (γ) processing on exposure plus correction image
Brighten +4: gamma (γ) processing on exposure plus correction image Similarly, in the case of adjust to darken being set in the brightness adjustment, the following results.

Darken −1: image composition of standard exposure image data 0.5 and exposure minus correction image data 0.5
Darken −2: exposure minus correction image data
Darken −3: gamma (γ) processing on exposure minus correction image
Darken −4: gamma (γ) processing on exposure minus correction image Note that adjusting the width of change of the exposure values in exposure bracket shooting is possible. Accordingly, in the case of performing exposure bracket shooting such that shooting is performed while changing the exposure value by ±0.5 EV, with one adjustment step in the brightness adjustment corresponding to an exposure value of 0.5 EV, the image data shot using plus correction will correspond to brighten +1 of the brightness adjustment. As described above, the result of image composition on images and the result of correction processing by image data will be output as the result of the image correction processing.

Note that correction processing by image processing could possibly result in a drop in quality depending on the conditions of the image data. Accordingly, it is also conceivable, in the case where a setting such as prioritize image quality is configured, to restrict the range that can be corrected with only image composition processing, that is, restrict the range of brightness adjustment to within ±2, in terms of the above example.

According to embodiment 3 of the present invention as described above, when performing correction processing on image data, the user is able perform correction processing with a similar operation procedure in either case, without being aware of whether or not the input image data is a plurality of image data shot using auto bracket shooting.

Further, a high quality image can be easily obtained by performing image composition processing of image data and correction processing by image processing to perform finer adjustment, in the case of a plurality of image data.

Fourth Embodiment

Embodiments 1, 2 and 3 were all described with brightness adjustment as an example of correction processing. However, the present invention is applicable provided that the correction processing and the auto bracket shooting function correspond, such as shown in FIG. 13.

In embodiment 4, red-eye correction processing will be described as an example, as application of another type of correction processing. Note that with flash shooting in an imaging apparatus, shooting of a plurality of image data by pre-illuminating the flash directly before shooting with the main flash illumination, in order to reduce the so-called red-eye phenomenon, is called red-eye reduction bracket shooting. In the present embodiment, two image data are shot with red-eye reduction bracket shooting, and an image file with one of the image data as the head image is input.

Note that in embodiment 4, similarly to embodiment 1, it is identified whether image data included in an input image file was shot using auto bracket shooting. Then, when performing image correction on image data shot with auto bracket shooting, the shooting condition and the image correction processing are compared. Next, if there is correspondence between the shooting condition and the image correction processing, based on a predefined correspondence table, the image correction processing is implemented on the basis of other image data shot with auto bracket shooting. Note that the schematic configuration of the image processing apparatus in embodiment 4 is similar to embodiment 1.

Figure 10:
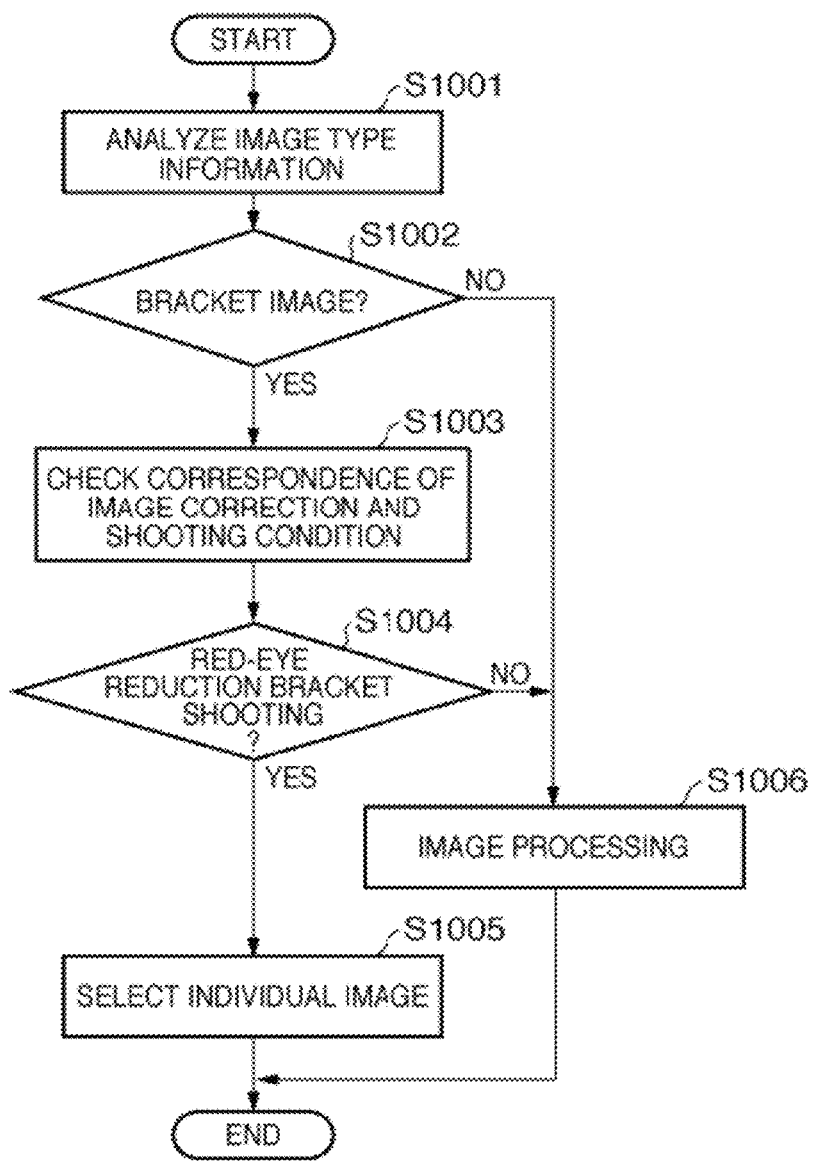
FIG. 10 is a flow diagram of red-eye correction processing in embodiment 4 of the present invention.

FIG. 10 is a flow diagram of red-eye correction processing in embodiment 4 of the present invention. The following adjustment processing is implemented by the CPU 1101 based on a program stored in the ROM 1102. In the case where an instruction to execute red-eye correction is accepted by the print setting input unit 102, firstly, input image file analysis processing is performed in the image file analysis unit 103 (S1001). Specifically, the image file analysis unit 103 analyzes the type information of the image, and identifies whether the input image data is an image shot using auto bracket shooting. Further, in the case where the input image data is determined to be an image file composed of a plurality of image data shot using auto bracket shooting, the image file analysis unit 103 identifies which of the auto bracket shooting functions the input image data was shot with, out of the subdivisions of functions shown in FIG. 12. Here, if the input image file is analyzed as not being constituted by image data shot using auto bracket shooting (S1002: NO), correction processing by image processing is performed as the red-eye correction processing (S1006). Various red-eye correction processes by image processing has been proposed heretofore, and those methods will not be discussed here.

On the other hand, if the input image file is analyzed as being constituted by a plurality of image data shot using auto bracket shooting (S1002: YES), the correspondence between the designated type of correction processing and the type of auto bracket shooting function is identified (S1003). That is, red-eye reduction bracket shooting corresponds with red-eye correction, based on the correspondence relation of correction processing and auto bracket shooting functions in FIG. 13. After the correspondence has been identified, it is determined whether the auto bracket shooting function of the input image data corresponds to the correction processing. In the present example, it is determined whether the input image data is a red-eye reduction bracket image (S1004). If it is determined that the input image data is not a red-eye reduction bracket image, despite being a plurality of image data shot using auto bracket shooting (S1004: NO), red-eye correction processing is performed by image processing (S1006).

On the other hand, if the input image file is constituted by a plurality of image data shot using red-eye reduction bracket shooting, which corresponds to red-eye correction (S1004: YES), another individual image that differs from the head image is output as the processing result of red-eye correction. That is, in S1005, a red-eye reduction bracket image in which red-eye has been reduced by pre-illumination is selected.

According to embodiment 4 of the present invention as described above, when performing correction processing on image data, the user is able perform correction processing with a similar operation procedure in either case, without being aware of whether or not the input image data is a plurality of image data shot using auto bracket shooting. Note that the degree to which the color of the pupil turns red varies greatly between individuals, and the image is often not corrected as the user desires with technology for correcting the red-eye phenomenon with image processing. Thus, image data in which the red-eye phenomenon does not occur or has been reduced may be of higher quality, and a high quality image can be easily obtained by selecting a red-eye reduction bracket image according to the conditions in the present embodiment.

Other Embodiments

Aspects of the present invention can also be realized by a computer of a system or apparatus (or devices such as a CPU or MPU) that reads out and executes a program recorded on a memory apparatus to perform the functions of the above-described embodiments, and by a method, the steps of which are performed by a computer of a system or apparatus by, for example, reading out and executing a program recorded on a memory apparatus to perform the functions of the above-described embodiments. For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-008245, filed Jan. 16, 2009, which is hereby incorporated by reference herein in its entirety.

What is claimed is:

1. An image processing apparatus comprising:
an inputting unit configured to input image data;
a reception unit configured to receive a correction processing instruction for the image data input by the inputting unit;
a determining unit configured to determine whether or not the image data, input by the inputting unit, represents a plurality of image data with different shooting conditions shot using an auto-bracket shooting function;
an identification unit configured, in a case where the image data is determined by the determining unit to represent image data with different shooting conditions shot using an auto-bracket shooting function, to identify a specific auto-bracket shooting function corresponding to the correction processing instruction received by the reception unit through reference to a correspondence table in which auto-bracket shooting functions correspond to respective correction processing instructions;
a selecting unit configured, in a case where the auto-bracket shooting function determined by the determining unit for the input image data is the specific auto-bracket shooting function identified by the identification unit, to select the image data corresponding to conditions of the correction processing instruction received by the reception unit from the plurality of image data with different shooting conditions input by the inputting unit; and
a correction unit configured, in a case where the auto-bracket shooting function determined by the determining unit for the input image data is not the specific auto-bracket shooting function identified by the identification unit, to correct the image data input by the inputting unit.

2. The image processing apparatus according to claim 1, wherein the input data input by the inputting unit is image data within an image file composed of a plurality of image data.

3. The image processing apparatus according to claim 1, wherein the correction processing is brightness adjustment processing, and
the specific auto-bracketing shooting function corresponding to the correction processing is exposure bracket shooting.

4. The image processing apparatus according to claim 1, wherein the correction processing is processing for adjusting to brighten the image data, and
the selecting unit is configured to select image data shot with exposure plus correction from the plurality of image data with different shooting conditions input by the inputting unit.

5. The image processing apparatus according to claim 1, wherein the correction processing is processing for adjusting to darken the image data, and
the selecting unit is configured to select image data shot with exposure minus correction from the plurality of image data with different shooting conditions input by the inputting unit.

6. The image processing apparatus according to claim 1, wherein the correction processing is red-eye correction processing, and
the specific auto-bracket shooting function corresponding to the correction processing is red-eye reduction bracket shooting.

7. The image processing apparatus according to claim 1, wherein the image data input by the inputting unit is image data within an image file composed of a series of image data with different shooting conditions shot in a single shooting operation.

8. The image processing apparatus according to claim 1, further comprising:
a composition unit configured to compose the plurality of image data selected by the selecting unit.

9. The image processing apparatus according to claim 8, wherein the correction processing received by the reception unit is performed on composed image data obtained after the composition processing by the composition unit.

10. An image processing method comprising:
inputting image data;
receiving a correction processing instruction for the image data input in the inputting step;
determining whether or not the image data, input in the inputting step, represents a plurality of image data with different shooting conditions shot using an auto-bracket shooting function;
identifying, in a case where the image data is determined in the determining step to represent image data with different shooting conditions shot using an auto-bracket shooting function, a specific auto-bracket shooting function corresponding to the correction processing instruction received in the receiving step through reference to a correspondence table in which auto-bracket shooting functions correspond to respective correction processing instructions;
selecting, in a case where the auto-bracket shooting function determined in the determining step for the input image data is the specific auto-bracket shooting function identified in the identifying step, the image data corresponding to conditions of the correction processing instruction received in the receiving step from the plurality of image data with different shooting conditions input in the inputting step; and correcting, in a case where the auto-bracket shooting function determined in the determining step for the input image data is not the specific auto-bracket shooting function identified in the identifying step, the image data input in the inputting step.

11. A control program storable on a computer-readable storage medium that, when run on a computer, causes the computer to execute an image processing method according to claim 10.

* * * * *